United States Patent Office 3,022,167
Patented Feb. 20, 1962

3,022,167
PHOTOGRAPHIC PRODUCTS, PROCESSES AND COMPOSITIONS
Milton Green, Newton Highlands, Mass., assignor to Polaroid Corporation, Cambridge, Mass., a corporation of Delaware
No Drawing. Filed Mar. 28, 1957, Ser. No. 649,020
7 Claims. (Cl. 96—61)

This invention relates to novel chemical compounds and more particularly to certain novel chemical compounds useful as photographic developing and antistain agents and products and processes utilizing said compounds.

One object of this invention is to provide novel chemical compounds and suitable syntheses for their preparation.

Another object of the invention is to provide novel photographic developing agents which possess various rates of mobility, and compositions containing them, for the development of silver halide emulsions.

A further object is to provide novel photographic antistain agents for use in color processes.

Other objects of this invention will in part be obvious and will in part appear hereinafter.

The invention accordingly comprises the several steps and the relation and order of one or more of such steps with respect to each of the others, and the products and compositions possessing the features, properties and the relation of elements which are exemplified in the following detailed disclosure and the scope of the application of which will be indicated in the claims.

The following detailed description will give a fuller understanding of the nature and objects of the invention.

The novel compounds of this invention may be represented by the formulae:

(1) 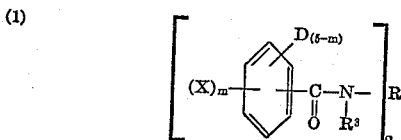

(2) 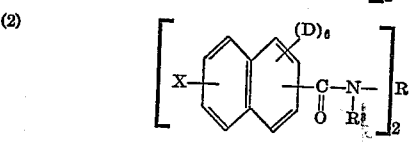

(3) 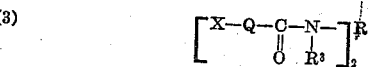

wherein R is a bivalent hydrocarbon radical, and is preferably an arylene or aralkarylene radical; each $R^3$ may be a hydrogen, alkyl, or aryl radical; Q may be a single valence bond, i.e., a covalent bond, or a bivalent hydrocarbon radical; m is a positive integer from 1 to 5 inclusive and preferably 3; each D may be a hydrogen or alkyl group; and each X is selected from the group consisting of carboxyl, i.e.

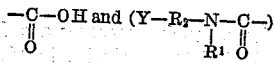

radicals provided that at least one X is a

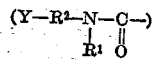

radical. In the

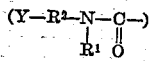

radicals each $R^1$ may be a hydrogen, alkyl, or aryl group; each $R^2$ may be a single valence bond, i.e., a covalent bond, or a bivalent hydrocarbon radical and each Y is a 2,5-dihydroxyphenyl, a 2,3-dihydroxyphenyl, or a 3,4-dihydroxyphenyl group which may be further substituted by alkyl or halogen groups.

The expression "bivalent hydrocarbon radicals" refers to hydrocarbon groups wherein the two free valences are satisfied by different atoms. As examples of bivalent hydrocarbon radicals comprehended by the radicals Q, R, and $R^2$ in the above definitions, mention may be made of alkylene groups such as $-CH_2-$, $-CH_2CH_2-$, arylene groups, aralkylene groups such as

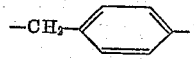

and aralkarylene groups such as

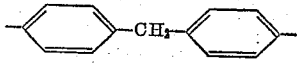

As examples of the

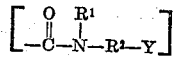

radical in the above formulae, mention may be made of the following:

(1) 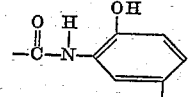

(2) 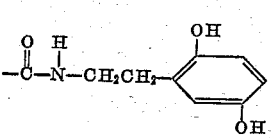

(3) 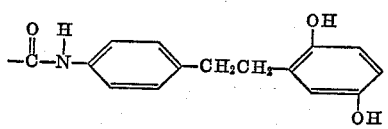

(4) 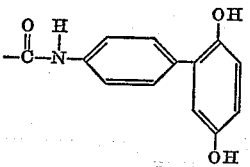

When Q in the above definition is a covalent bond, the compounds are derived from oxalic acid.

In the preferred embodiment R is a diphenyl-methane radical and m is a number from 1 to 3. Such compounds may be represented by the formula:

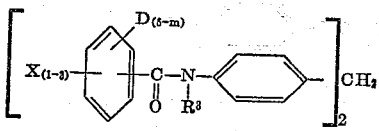

wherein D, X and $R^3$ have the same meaning as above.

One method of preparing compounds within the scope of this invention is by condensing two mols of a suitable acid chloride, said acid chloride being at least dibasic, e.g., pyromellityl chloride, with one mol of a dibasic amine and reacting the free acyl chloride radicals, i.e.,

of the intermediate with an excess of a suitable amine or mixture of amines containing the appropriate $-R^2-Y$ radical, e.g., p-aminophenethyl-hydroquinone or a mixture of p-aminophenethyl-hydroquinone and p-aminophenyl-hydroquinone. The amine salts may also be used.

Another method of preparing compounds within the scope of this invention is by condensing two mols of a dibasic acid anhydride, e.g., phthalic anhydride, with one mol of a dibasic amine and reacting the free carboxyl radicals of the intermediate with an excess of a suitable amine or mixture of amines containing the appropriate —$R^2$—Y radical.

Still another method of preparing compounds within the scope of the invention is by condensing two mols of an acid which is at least dibasic, e.g., oxalic acid, sebacic acid, etc., with one mol of a dibasic amine and reacting the free carboxyl radicals of the intermediate with an excess of a suitable amine or mixture of amines containing the appropriate —$R^2$—Y radical.

As examples of suitable dibasic amines useful in the above preparations, mention may be made of 4,4'-diaminodiphenylmethane, p-phenylene diamine, etc.

The following example illustrates the preparation of compounds within the scope of this invention, and particularly the preferred embodiment, and is given as an illustration only:

Example 1

0.3 gm. of diaminodiphenylmethane is added to 1 gm. of pyrromellityl chloride in 25 cc. of pyridine and the solution is refluxed for one-half hour. 10 gms. of p-aminophenethyl-hydroquinone-O,O'-diacetate hydrochloride dissolved in 35 cc. of pyridine is added to the above solution and it is refluxed for an additional one-half hour and cooled. The reaction product is separated by precipitating in a hydrochloric acid-ice bath.

The tan precipitate is filtered and the acetate radicals are hydrolyzed off, under partial vacuum, by subjecting the precipitate to an aqueous ethanol solution of sodium hydroxide over a steam bath for a few minutes.

The reaction product is cooled and then precipitated by adding dilute hydrochloric acid. Upon filtering, washing, and drying, 4.5 gms. of a developer having the probable formula:

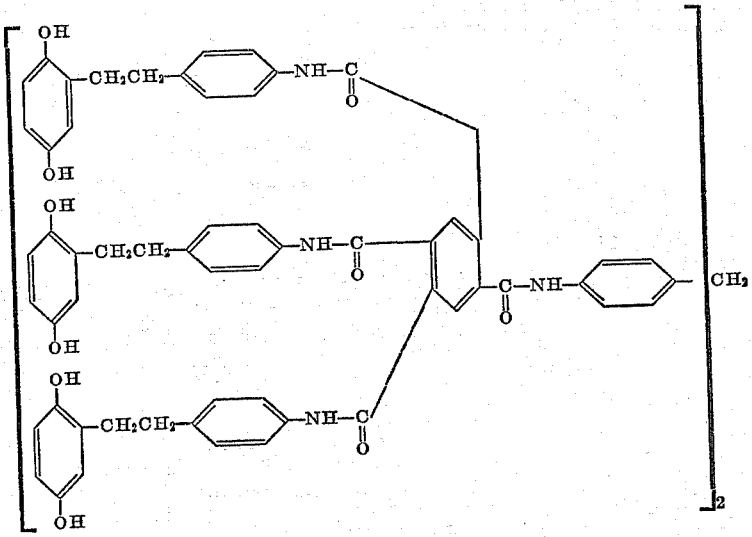

is obtained, and this product may be described as 4,4'-bis-[2",4",5"-tri-(p-[2''',5''' - dihydroxyphenethyl] - phenylcarbamyl)-benzamido]-diphenylmethane.

It will be noted that in the above example and in other preparations wherein at least dibasic and preferably tribasic, tetrabasic, etc., acids and acid chlorides are used that polymeric compounds may be obtained by increasing the amount of dibasic amine so that the molar ratio of amine to acid will approach 1.

As pointed out previously, the novel compounds of this invention are useful as developing agents for silver halide emulsions. As an example of a suitable developing composition utilizing one of the novel compounds of this invention, mention may be made of the following composition:

| | |
|---|---:|
| Water _____cc__ | 100 |
| Potassium bromide _____gm__ | 0.2 |
| Sodium hydroxide_____gm__ | 3.0 |
| 4,4'-bis-[2",4",5"-tri-(p-[2''',5''' - dihydroxyphenethyl]-phenylcarbamyl) - benzamido] - diphenylmethane_____gm__ | 1 |

It will be understood that it is within the scope of this invention to vary the developer composition illustrated above. The percentage of ingredients may be varied to suit particular needs. Mixtures of the novel developing agents may be used. If the composition is to be applied to the emulsion by being spread thereon, in a thin layer, it may also include a film-forming thickening agent such, for example, as a high molecular weight polymer, e.g., sodium carboxymethyl cellulose.

Further, the use of the developing agents of this invention is in no way restricted to incorporating them into developing compositions; where desired they may be employed in photosensitive elements, e.g., by placing them in or behind a silver halide emulsion layer. When so placed they may be made functional by permeating said emulsion with an aqueous alkaline solution.

As noted previously, the novel compounds of this invention possess various rates of mobility in photographic processes. In general the relative rate of mobility of compounds within the scope of the invention will vary inversely with the number of amide groups in the molecule.

The developing agents which possess relatively higher mobility are useful in diffusion-transfer reversal processes, both dye and silver, and are especially useful in such photographic processes wherein it is desired to eliminate or minimize the need for washing or stabilizing operations in liquid baths subsequent to the formation of the silver print. Examples of such processes are disclosed in U.S. Patent No. 2,647,056 to Edwin H. Land. The utility of the developers of this invention however is by no means limited to diffusion-transfer reversal processes for they may be satisfactorily employed in conventional multistage and multi-bath photographic processes either in black-and-white or color photography. Where the herein disclosed novel developing agents are employed in diffusion-transfer reversal processes of the type disclosed in the said patent to Edwin H. Land, the novel developer compositions of this invention may have incorporated therein as a further ingredient a silver halide solvent such as sodium thiosulfate. Thus by adding sodium thiosulfate to the composition illustrated above and using an image-receiving element in conjunction with the photosensitive element a transfer image may be obtained.

The novel developing agents of this invention which possess relatively low mobility are especially useful in photographic diffusion-transfer processes in which it is desirable to exclude the developing agent from the image-receiving element or where it is desired to substantially prevent the developer from wandering from a particular portion of the photosensitive element. Such low mobility developers are particularly useful in the processes disclosed and claimed in the copending application of Howard G. Rogers, Serial No. 599,122, filed July 20, 1956.

In multilayer color processes, where antistain agents which are relatively immobile are required, the novel low mobility compounds of this invention are again useful.

The novel compounds of this invention are further useful as antioxidants in petroleum products, etc. They are also useful as intermediates.

Since certain changes may be made in the above product, processes and compositions without departing from the scope of the invention herein involved, it is intended that all matter contained in the above description shall be interpreted as illustrative and not in a limiting sense.

5′′′-dihydroxyphenethyl]-phenylcarbamyl) benzamido]-diphenylmethane.

4. A photographic product comprising a support, said support bearing on one surface a plurality of layers including a silver halide emulsion layer, at least one of said layers containing at least one compound selected from the group of compounds within the formula:

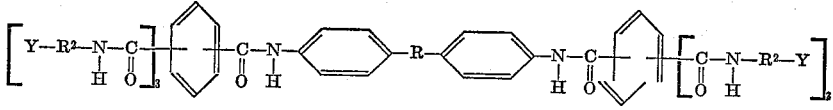

wherein R is a methylene group, $R^2$ is a phenethyl group, in which the ethyl group of said phenethyl group is linked to the Y radical and Y is selected from the group consisting of ortho-dihydroxyphenyl and para-dihydroxyphenyl radicals.

5. A photographic product comprising a support, said support bearing on one surface a plurality of layers including a silver halide emulsion layer, at least one of said layers containing 4,4′-bis-[2′′,4′′,5′′-tri-(p-[2′′′,5′′′-dihydroxyphenethyl]-phenylcarbamyl)-benzamido] - diphenylmethane.

6. A process of developing an exposed silver halide emulsion, said process comprising treating said emulsion for a sufficient time to develop the latent image to silver with an aqueous solution comprising an alkaline material and at least one compound selected from the group of compounds within the formula:

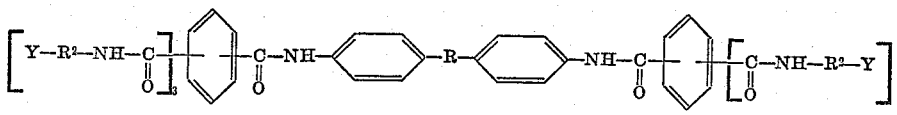

What is claimed is:

1. As a photographic developer composition for the formation of silver transfer prints, an aqueous solution comprising an alkaline material, a silver halide solvent, said solvent being capable of forming a soluble complex with silver halide, at least one compound selected from the group of compounds within the formula:

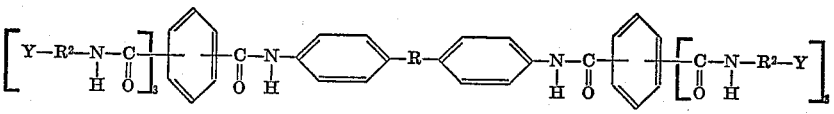

wherein R is a methylene group, $R^2$ is a phenethyl group, the ethyl substituent of said phenethyl group being linked to the Y radical is selected from the group consisting of ortho-dihydroxyphenyl and para-dihydroxyphenyl radicals.

2. A composition as defined in claim 1 including a film-forming, viscosity-increasing agent.

3. As a novel photographic developer composition for the formation of silver transfer prints, an aqueous solution comprising an alkaline material, a silver halide solvent, said solvent being capable of forming a soluble complex with silver halide, and 4,4′-bis-[2′′,4′′,5′′-tri-(p-[2′′′,- wherein R is a methylene group, $R^2$ is a phenethyl group, the ethyl substituent of said phenethyl group being linked to the Y radical and Y is selected from the group consisting of ortho-dihydroxyphenyl and para-dihydroxyphenyl radicals.

7. A method of developing an exposed silver halide emulsion which comprises treating said emulsion with an aqueous solution comprising an alkaline material and 4,4′ - bis - [2′′,4′′,5′′-tri-(p-[2′′′,5′′′-dihydroxyphenethyl]-phenylcarbamyl) - benzamido] - diphenylmethane for a sufficient time to develop the latent image to silver.

References Cited in the file of this patent
UNITED STATES PATENTS

| | | |
|---|---|---|
| 2,515,147 | Wasley | July 11, 1950 |
| 2,610,122 | John et al. | Sept. 9, 1952 |
| 2,670,374 | Cusic | Feb. 23, 1954 |
| 2,713,594 | Sauer | July 19, 1955 |
| 2,735,765 | Loria et al. | Feb. 21, 1956 |